United States Patent [19]
Harben, Jr.

[11] 3,828,397
[45] Aug. 13, 1974

[54] POULTRY STUNNING APPARATUS
[75] Inventor: Grover S. Harben, Jr., Gainesville, Ga.
[73] Assignee: Gainesville Machine Company, Inc., Gainesville, Ga.
[22] Filed: Sept. 26, 1972
[21] Appl. No.: 292,391

[52] U.S. Cl. ................................. 17/11, 17/1 E
[51] Int. Cl. ........................................ A22c 21/00
[58] Field of Search.................. 17/1 E, 11; 43/98

[56] References Cited
UNITED STATES PATENTS
3,564,645   2/1971   Brugman................................. 17/11
3,702,017   11/1972  Lewis..................................... 17/1 E Primary Examiner—Robert Peshock
Attorney, Agent, or Firm—Newton, Hopkins & Ormsby

[57] ABSTRACT

A poultry stunning apparatus and method for stunning and thereby immobilizing poultry for a sufficient length of time that it can be more readily handled for killing.

The apparatus includes a tank for containing a non-toxic electrolyte liquid, such as salt and water, the level of which is maintained by a float valve. Poultry, disposed head down on successive shackles, are moved across the tank at such a height with respect to the tank that the head of each bird is pulled along the surface of a foraminous electrode tray, successive increments of which are disposed in staggered relationship, slightly above and slightly below the liquid level. Thence, the bird is pulled up an inclined drain plate which directs excess liquid back into the tank.

Cranks and cables enable the tank to be raised or lowered so as to be at the proper level for the poultry line. Make-up water is automatically fed to a feed tank over a grid type strainer on which salt crystals are deposited for being dissolved in the make-up water.

An electrical circuit from the shackle to the tank is closed by the fowl, when its head contacts the electrolyte, thereby stunning and immobilizing the bird.

8 Claims, 5 Drawing Figures

3,828,397

POULTRY STUNNING APPARATUS

CROSS-REFERENCE TO RELATED APPLICATIONS

This is a companion application to application Ser. No. 98,993, filed Dec. 17, 1970, for "Poultry Stunning Apparatus". Both applications have a common owner.

BRIEF SUMMARY OF THE INVENTION

This invention relates to a poultry stunning apparatus amd method and is more particularly concerned with an apparatus and method of passing sufficient electricity through the body of a fowl to stun and immobilize the fowl, prior to the time it is killed.

In the past, poultry has been subjected to an electrical shock in order to immobilize them during processing. Such devices have included tanks containing liquid, into which the head of the poultry is emersed. Such an operation has, however, caused the fowl to inhale the liquid, tending to contaminate the bird. Wetting of the entire bird, in order to pass an electric current through it, has also been attempted; however, this detracts from the ability of the picker fingers of the picker to pluck the bird efficiently.

The poultry stunning apparatus of application, Ser. No. 98,993, while operating most satisfactorily, nevertheless, due to the water spray, will at times cause salt water to enter the lungs of the poultry and tends to wet the feathers of the poultry too much for efficient picking operation.

Briefly described, the present invention, which obviates the problems described above, includes a stunning apparatus in which an electrode tray, having successive panels respectively slightly below and above the level of an aqueous saline solution electrolyte in a tank, receives and supports the head portions of successive poultry carried inverted on the successive shackles of a poultry line. The shackles being metal, contact an electrode bus as the birds are passed over the tank while the head of the bird contacts the electrolyte metal parts of the tank and tray. Thus, an electrical circuit, through the body of the fowl is made for stunning it. Adjacent the electrolyte tank and in communication therewith is the makeup liquid tank having a screen strainer disposed over its open upper portion.

Crystalline salt is disposed on the screen strainer and the makeup water periodically flowed over this salt in order to insure a proper liquid level of saturated saline solution in the tank. The tank is carried by dielectric supports on a frame which includes a plurality of cranks and cables by means of which the level of the tank can be adjusted vertically.

A bird, carried by a shackle into the apparatus of the present invention, would have its head pulled along a submerged panel of the foraminous tray and then along a non-submerged panel of the tray, etc. The submerged panel of the tray contains a shallow quantity of electrolyte, such that the liquid will contact the head of the poultry, but at the same time, permit the nostrils and mouth of the bird to remain essentially non-submerged so that the poultry can continue to breathe. As the head passes along a non-submerged panel of the tray, the head is supported entirely out of the liquid and the liquid is drained from the head while electrical contact is maintained between the head and the tray. From the tray, the poultry is pulled along an inclined drain plate which maintains electrical contact with the head of the poultry.

Accordingly, it is an object of the present invention to provide an apparatus for stunning poultry, the apparatus being inexpensive to manufacture, durable in structure and efficient in operation.

Another object of the present invention is to provide an apparatus for stunning poultry which can be readily and easily adapted to any size poultry carried by shackles in a conventional poultry line.

Another object of the present invention is to provide an apparatus for stunning poultry in which successive birds are subjected to similar quantities of electricity.

Another object of the present invention is to provide an efficient method of electrically stunning successive birds in a pountry line.

Another oject of the present invention is to provide an apparatus and process by means of which poultry is electrically stunned, and in which there is little danger of the bird inhaling the electrolyte contained in the apparatus.

Another object of the present invention is to provide an apparatus and method of stunning poultry without the necessity of wetting the body of the bird.

Other objects, features and advantages of the present invention will become apparent from the following description when taken in conjunction with the accompanying drawings wherein like characters of reference designate corresponding parts throughout several views and wherein;

DETAILED DESCRIPTION

Figure 1:
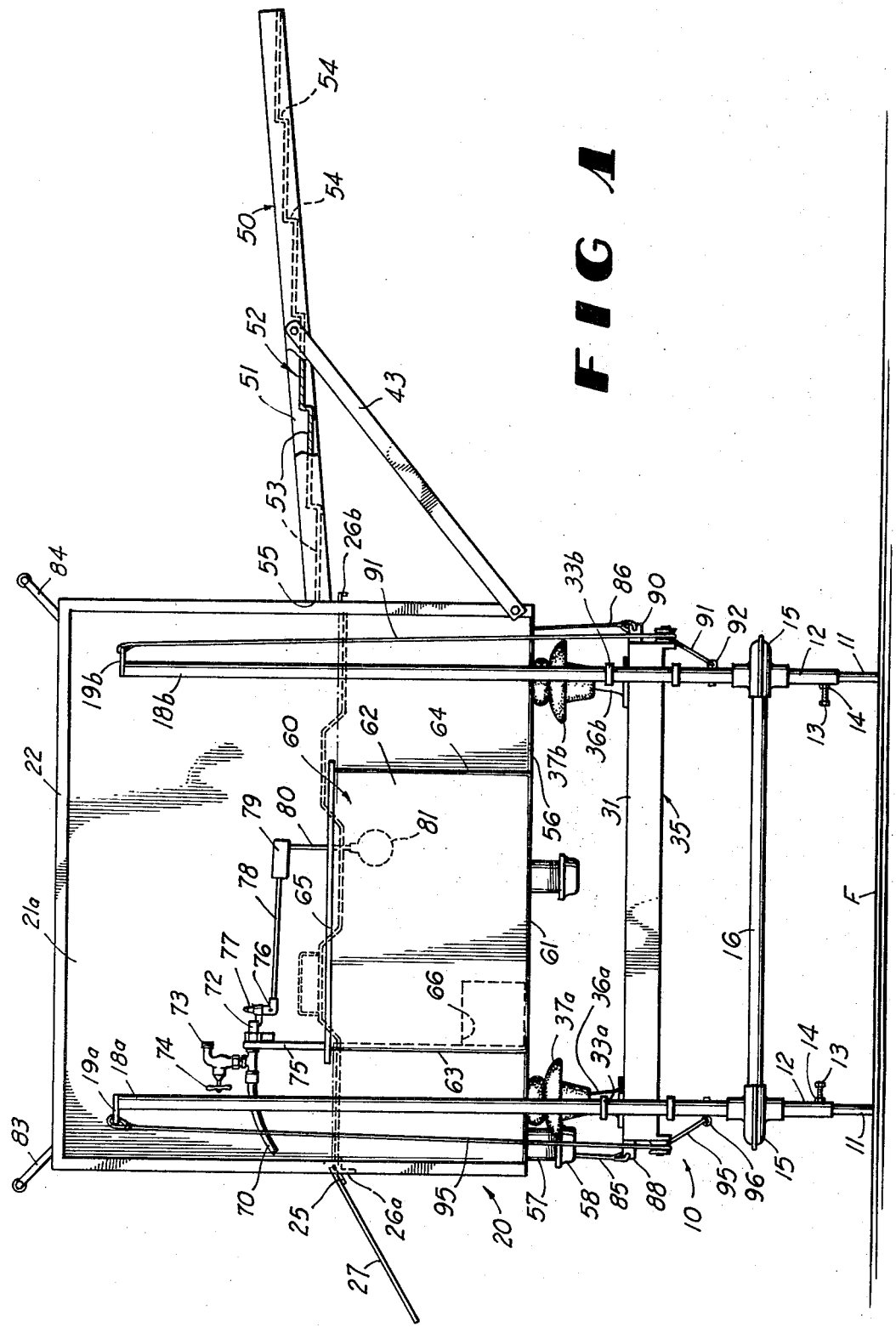
FIG. 1 is a side elevational view of a poultry stunner constructed in accordance with the present invention.
Figure 2:
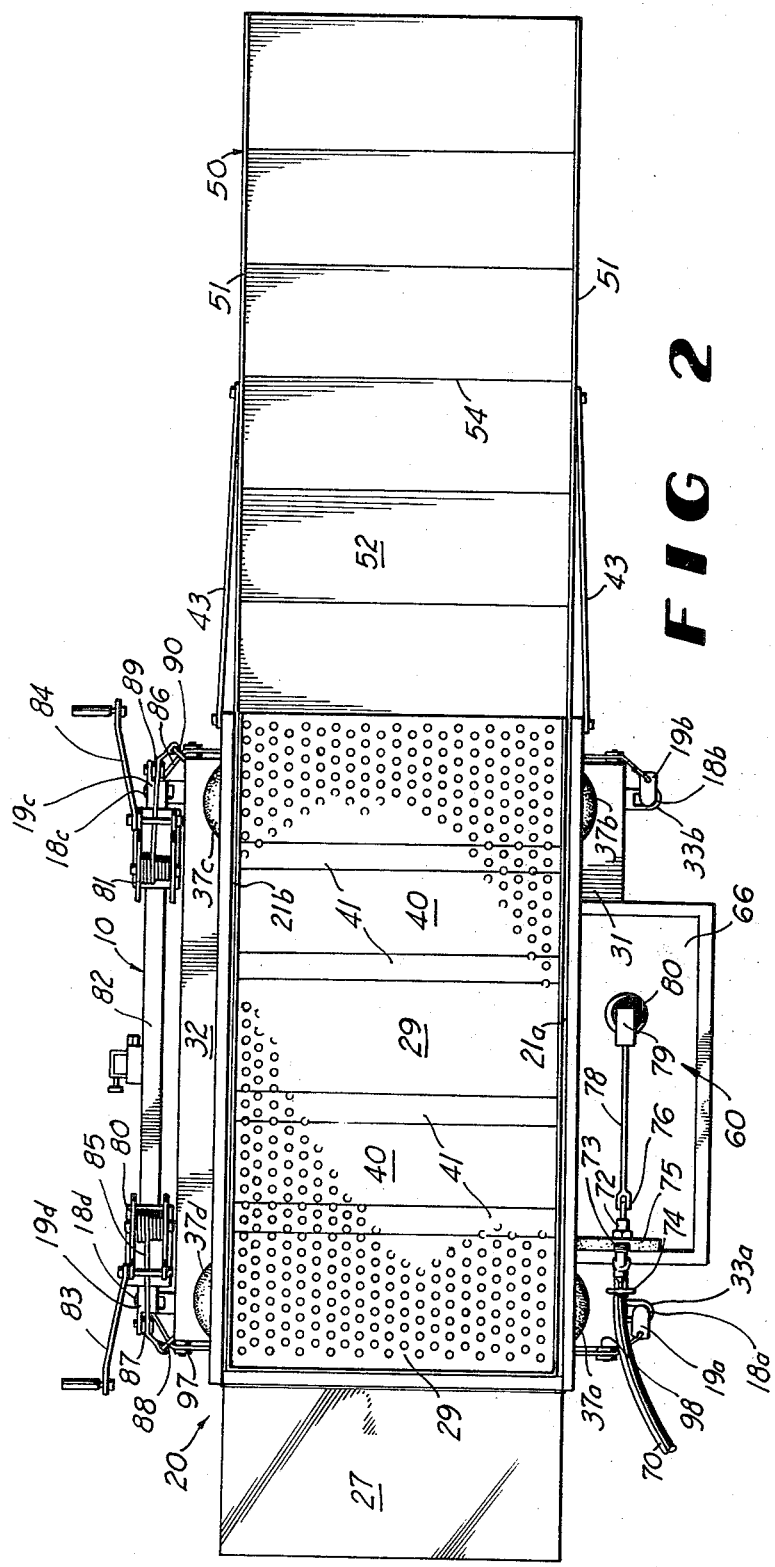
FIG. 2 is a top plan view of the stunner shown in FIG. 1.
Figure 4:
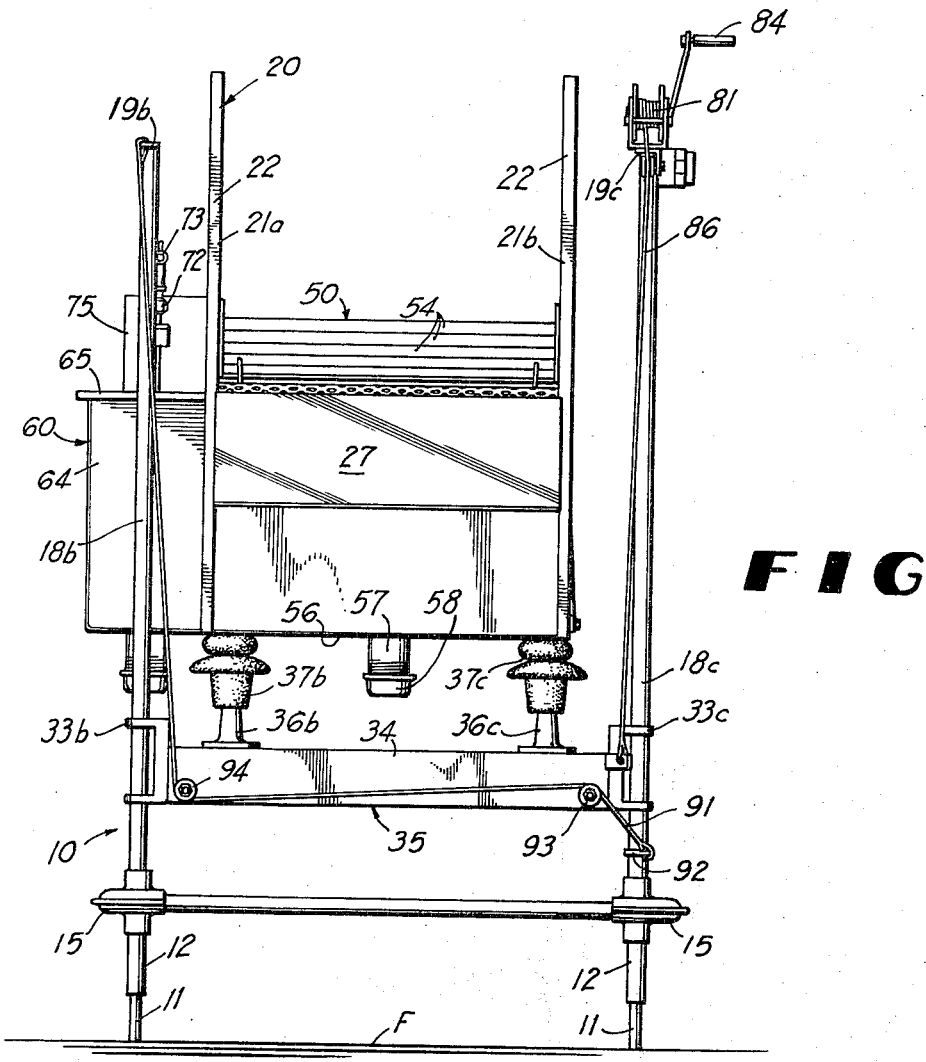
FIG. 4 is an end view of one end of the poultry stunner depicted in FIGS. 1 & 2.

Referring now in detail to the embodiments chosen for the purpose of illustrating the present invention, numeral 10, in FIGS. 1, 2 & 4, denotes generally a supporting frame for the stunner tank 20. As will be explained in more detail, hereinafter, the tank 20 is incrementally moveable, vertically, with respect to the frame 10 so that its height may be adjusted to conform to the height of the poultry line, denoted generally by numeral 30, in FIG. 5. This poultry line 30 is typical of the poultry lines which are found within the conventional poultry processing plant for supporting and conveying poultry P on electrically conducting shackles 31. On the shackle 31, each bird is supported by its legs, the bird being inverted and head down.

The frame 10 includes a plurality of upstanding legs 11 which are mounted on the floor F of the processing plant. Each leg 11 is telescopically received within a vertically disposed sleeve 12 and is locked in place by a set screw 13 which threadedly passes through one side of each sleeve 12. The set screw 13 is prevented from rotating by a lock nut 14, as will be understood by those skilled in the art. The legs 11, sleeves 12, set screws 13 form a means for adjusting the level of the tank 20.

The upper end portion of each sleeve 12 is received in a corner block 15, the corner block 15 also receiving the end portions of cross bars, such as cross bars 16 and 17, to form a lower horizontally disposed rectangular frame assembly in which the blocks 15 are disposed in the corners thereof.

The corner blocks 15 respectively support, in upright position, the hollow cylindrical parallel corner posts 18a, 18b, 18c and 18d perpendicular to floor F. The upper ends of corner posts 18a, 18b, 18c and 18d terminate in a common horizontal plane and are respectively provided with end caps 19a, 19b, 19c and 19d.

Slideably received respectively on the corner posts 18a, 18b, 18c and 18d are slide blocks, such as the slide blocks 33a, 33b and 33c. The slide blocks 33a, 33b, which are received respectively on corner posts 18a and 18b, support intermediate portions of a longitudinal beam 31 while the slide blocks 33c and the other slide block (not shown) support a similar longitudinal beam 32. The beams 31 and 32 extend parallel to each other and form the longitudinal beams of a horizontal elevator frame which includes transverse ribs, such as rib 34. Thus is provided a base elevator frame, denoted generally by numeral 35, which is capable of being moved upwardly and downwardly, while remaining disposed horizontally.

Mounted on the ribs, such as rib 34, are upstanding pedestals 36a, 36b, 36c, 36d which respectively support on their upper end portions the dielectric elastomeric insulator caps 37a, 37b, 37c and 37d. The purpose of the insulator caps 37a, 37b, 37c and 37d is to provide dielectric supports for the corner portions of the stunning tank 20, while electrically insulating the same from the frame 10.

The stunning or electrolyte tank 20 includes a pair of upstanding transversely spaced longitudinally disposed flat rectangular side plates 21a and 21b. Each of the plates 21a, 21b is provided with an inverted U-shaped frame denoted by numeral 22, the frame covering the upper edge of the side plate and the forward and rear edges thereof. The lower portions of the forward and rear edges of the side plates 21a, 21b are joined by front and rear end panels 23 and 24. A crossbar 25 is provided across the upper edge of panel 23 while a crossbar 26b is provided across the upper edge portion of the panel 24.

Since the parallel plates 21a, 21b extend above panels 23 and 24, the upper portions of plates 21a, 21b form shields on opposite sides of the stunning zone so that the electrolyte will not be thrown out by activity of the birds P. The shield portions also define a longitudinal passageway through which shackles 31 travel. They also prevent the operator from coming into contact with the hot side of the electrical circuit.

An upwardly and inwardly inclined chute or in-feed ramp 27 is supported in cantilever fashion by the crossbar 25 so as to provide a means for directing the heads of the poultry P upwardly for dropping into the tank 20.

Figure 5:
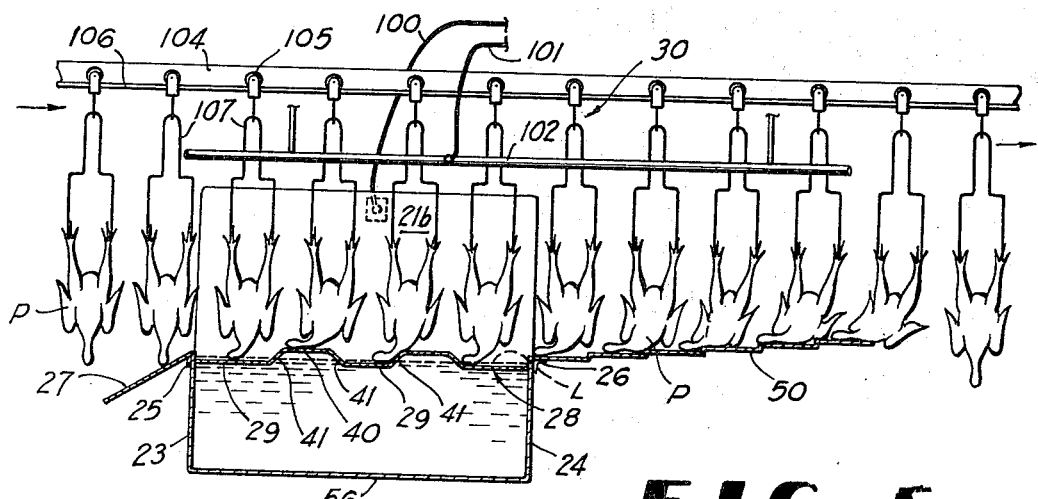
FIG. 5 is a schematic side elevational view of a poultry line operating in conjunction with the stunner depicted in FIGS. 1, 2 and 4, the stunner being shown with its side cut away.

Within the tank 20 is a head supporting electrode tray, denoted by numeral 28. The forward and rear edge portions of the electrode tray 28 are supported by the front and rear cross-bars 26a and 26b, respectively. In more detail, the electrode tray 28 is formed from a perforated or foraminous electrically conducting metal sheet bent at spaced transverse increments to define a plurality of rectangular foraminous or perforated submerged panels or plates 29 separated by a plurality of perforated flat rectangular exposed or non-submerged panels or plates 40. The plates 29 and 40 are staggered with respect to or offset from each other, each alternate plate being a plate 29 and each other alternate plate being a plate 40. The plates 29 are in a common horizontal plane, slightly below the level L of electrolyte E. The plates 40 are in a common horizontal plane parallel to the plane of plates 29 but slightly above level L. The edges of adjacent plate 29 and 40 are joined by rectangular inclined plates, ramps or webs 41 which permit the heads of the poultry P to slide from riding on a lower submerged plate 29, up the inclined plate 41 and onto the upper plate 40, thence down an incline plate 41 and onto the submerged plate 29, as the poultry P is passed through the tank, as illustrated in FIG. 5.

The purpose of the plates 29 is to support the head of each bird P above its pendant position sufficiently that one side only of the head is immersed and to limit the amount of its immersion in the electrolyte E. The purpose of the plates 40 is to hold the head of each bird P above the electrolyte E and permit the electrolyte to drain from the head of the bird P, while maintaining electrical contract with a wide area of the side of the head of bird P and to permit normal breathing by the bird P.

Supported by the rear crossbar 26b and by brackets 43 is an inclined drying ramp, denoted generally by numeral 50. This drying ramp 50 includes a pair of parallel rearwardly and upwardly inclined side beams 51 carrying therebetween a stepped drain plate 52. The drain plate 52, as seen in FIGS. 1, 2 and 4 includes a plurality of parallel offset, vertically spaced rectangular drain panels 53, the forward end of each panel 53 being connected to the rear end of the next adjacent panel by a short vertically disposed web 54 in step-like fashion. A mid-portion of beams 51 is supported by upwardly and rearwardly inclined brackets 43, the lower ends of which are connected to the lower rear portions of the frames 22, as illustrated in FIGS. 1 and 2.

The front edge 55 of the drain plate 52 terminates slightly above the rear end portion of the tank 20 and is spaced above the submerged rearmost plate 29. Thus, each successive bird P, after having its head slightly submerged as it rides successively along a submerged plate 29, then along plate 40, etc., is submerged along a final submerged plate 29 and then is pulled onto drain plate 52, where it rides from plate 53 to plate 53, etc., the corners formed by the web 54 and a plate 53 serving to wipe the electrolyte from the head of the poultry P.

Plates 53 are inclined, slightly, so as to direct the electrolyte back into the tank 20. For draining the tank 20, the bottom 56 is provided with a drain pipe 57 which is normally capped by a cap 58.

Mounted on one side of the tank 20 and secured to a panel 21a, is a makeup tank denoted generally by numeral 60. The purpose of the makeup tank is to provide makeup electrolyte so as to maintain the proper level of electrolyte in the tank 20. This makeup tank 60 is substantially smaller than the tank 20, as best seen in FIG. 2. This tank 60 includes a bottom 61 which is in a common plane with bottom 56 of tank 20. The tank 60 also includes a vertical outer side wall 62 which is parallel to and spaced from its adjacent panel 21a and parallel front and back side wall 63 and 64 which form with the wall 62 and a portion of the panel 21a, a rectangular liquid-containing reservoir which is open on its upper side.

A frame 65 along the upper edge of the tank 60 retains a screen or strainer 66 over the open upper side of the tank 60. A hole 66, cut through the adjacent panel 21a, provides for communication of the makeup tank 60 with the tank 20. This hole 66 is adjacent the bottoms 56 and 61.

For feeding water or any other liquid into the makeup tank 60, a flexible hose 70, seen in FIG. 1, is provided from a source of water or liquid. This hose 70 leads to a T-valve 71 having a plunger 72 for opening and closing the valve upon linear movement of plunger 72. A faucet or spout 73 is mounted on the valve 71 so as to direct the water from the faucet 73 into the tank 60 when valve 71 is opened. This faucet 73, incidentally, has an emergency shut-off valve 74. The faucet 73 together with the valve 71 are mounted on an upstanding bracket 75 on one edge of the tank 60. A bell crank 76 has one arm 77 which actuates the plunger 72 and another arm which carries a rod 78. Rod 78, at its distal end carries a block 79, from which a dependent rod 80 extends. The lower end of rod 80 is connected to a float 81. When the float 81 rises to the proper level in the make-up tank 60, it shuts off valve 71 and thus the feed of water to the faucet 73. When, however, the level of liquid drops, the float 81 will drop, thereby again opening the valve 71 for feeding additional water, automatically, into the make-up tank 60. The spout is directed to flow over screen 66 and dissolve salt crystals thereon.

For raising and lowering the position of the tank 20, a pair of winches 80 and 81 are provided on a longitudinal crossbar 82 carried by the end caps 19c, 19d. The winches 80 and 81 are provided with cranks 83 and 84, respectively, and are also provided with cables 85 and 86, respectively. The crank 83 is for the purpose of varying the effective length of cable 85 and thus manipulating the front portion of the tank 20 while the crank 84 is for the purpose of varying the effective length of cable 86 and thus manipulating the the rear portion thereof. In order to accomplish this function, the cable 85 extends from the winch 80 over a pulley 87 disposed on cap 19d. Thence, the cable 85 extends downwardly and is connected to a bracket 88, seen in FIG. 1, on the forward left hand corner of the frame 35. In like manner, the cable 86 extends from winch 81 over a pulley 89, seen in FIG. 2, and thence downwardly to terminate at a bracket 90 on the rear left hand corner of frame 35.

For maintaining the frame 35 in a suspended horizontal position, when the cranks 83 and 84 are manipulated, a cable 91 anchored to an eye bolt 92 on corner post 18c extends transversly over a pulley 93 on rib 34 and thence under a pulley 94 on rib 34 leading, thereafter, upwardly to the cap 19b. A similar cable 95 is anchored by eye bolt 96 to post 18a, below the frame 35. This cable 95 leads upwardly, passing over a pulley 97, seen in FIG. 2, on the other crossbar (not shown) corresponding to crossbar 34. Thence, cable 95 extends across to pulley 98 and then upwardly to terminate at cap 19a.

The electrical circuitry of the present invention includes, as seen in FIG. 5, a wire 100 which is grounded or at a base potential and is connected to tank 20. Preferably cable 100 is connected to one of the panels 21a or 21b. The other cable 101, which is the hot side, leads to a horizontal rod or bus 102 which is suspended parallel to the monorail 104 of the poultry line 30. This monorail 104 has a plurality of roller brackets 105 riding therealong and being connected together by cables or chains 106. Each roller bracket 105 suspends a shackle 107.

Figure 3:
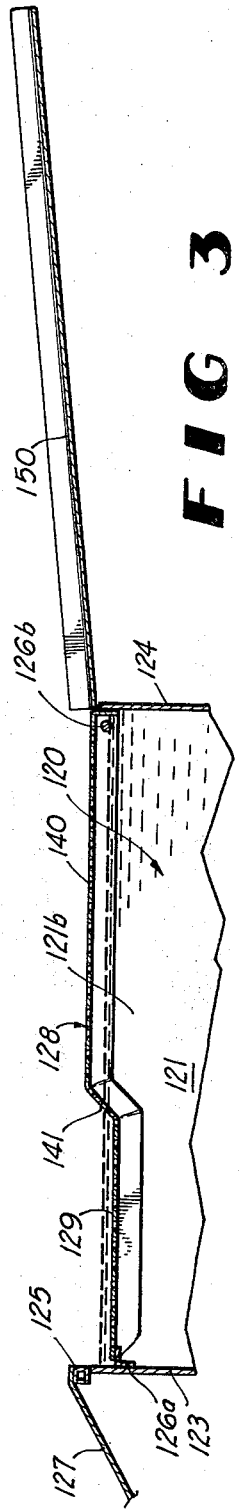
FIG. 3 is a fragmentary vertical sectional view of a modified form of the present invention showing a second embodiment of the electrode tray and the drain plate of the invention herein depicted.

In the modified form illustrated in FIG. 3, the inclined feed ramp 127 and crossbar 125 are identical to the ramp 27 and bar 25 while the tank 20 is identical to 120. The inclined discharge ramp 150, rather than being stepped, as is the ramp 50, is simply a smooth-surfaced inclined ramp which will permit the electrolyte E to flow back into the tank 120. A ledge 126a is provided inside of the tank 120, the ledge being in the form of an angle iron secured to front plate 123 of tank 120. The electrode tray, denoted generally by numeral 128, includes a single submerged front plate 129 and a single raised rear plate 140, joined together by an inclined ramp or web 141 at its central portion. The rear end portion of the panel 140 is bent downwardly to provide a lip 144 which hooks over a transverse rod 126b extending between the side 121a, 121b adjacent rear panel 126.

As explained above, the live poultry P is suspended respectively from shackles 107 and in inverted position by their legs and are moved along the poultry line 30 longitudinally through tank 20 or 120. These live poultry P first approach the inclined ramp 27 or 127 so that the head of each poultry P engages the ramp 27 or 127 and then is pulled into the tank 20 or 120 so as to ride along the first submerged plate 29 or 129. The normal level L, in FIG. 5, of the electrolyte E in the tank 20 is slightly above the submerged plate 29. The distance, however, is less than the distance necessary to completely submerge the nostrils of the average poultry P. Therefore, while the head of the poultry P is subjected to the electrolyte, as it is moved over the initial plate 29, the head is supported so that the bird P does not breathe in the electrolyte. There is also a natural tendency of the bird P to hold its breath as it passes along plates 29 or 129.

Nevertheless, in order to assure that the bird P has had time to breathe, the head of the bird P, after passing along plates 29 or 129, passes up the first incline ramp 41 or 141 and along the plate 40 or 140 which is above the level L. At this stage, the bird P is free of electrolyte E and can freely breathe. Nevertheless, due to the electrical contact, made by the shackle 107 along rod or bus 102, an electrical current passes through the bird, throughout the time that it engages any part of tank 20, the ramp 27, the electrode tray 28 or the ramp 50 or its counter parts in FIG. 3.

As seen in FIG. 5, the head of bird P, after passing along the plate 40, which permits any excess electrolyte E to drain into the tank 20, is again subjected to the electrolyte E, by passing onto a second submerged plate 29. Thereafter, it passes along a second upper plate 40 and then along a third plate 29 submerged slightly below the normal level L. Thence, the head of the bird P moves along the inclined ramp 50 and any excess liquid on the head of the bird P is permitted to drain back into the tank 20.

The bus 102 is so arranged that each shackle 107 electrically contacts the bus 102 as the head of poultry P moves up the inclined ramp 27 and only disengages from the bus 102 as the head of poultry P approaches the end of ramp 50. Preferably, the starting potential applied between the wires 100, 101, is approximately 57.5 volts. The apparatus is, however, provided with a potentiometer (not shown) by which the potential may be varied, as desired. The value of the voltage, of course, depends on the size of birds P being processed. It is always desirable to start off with a maximum voltage of 57.5 v. and work down. With fryers, the maximum voltage should be approximately 57.5 volts, provided a saturated saline solution is employed. A voltage potential in the neighborhood of 120 volts, while operative and may be required by prior art devices, will adversely affect the picking of the fowl P and should be avoided. Therefore, it is recommended at all times to maintain a saturated salt water solution. To accomplish this, the salt added to the make-up tank 60 should be such that at least some of the crystals are seen undissolved at the bottom of the tank 60.

I claim:

1. A poultry stunning apparatus for imparting an electric potential to poultry carried successively head down in a poultry line, comprising:
   a. a source of electric potential;
   b. means for connecting one side of the electric potential to the body of the poultry;
   c. an electrolyte tank for containing an electrolyte therein;
   d. head supporting means for supporting the head of the poultry within the tank above its pendant position at a prescribed level in the electrolyte;
   e. means for connecting the other side of said electric potential to said electrolyte; and
   f. means for moving the poultry across said tank, said head supporting means including means for periodically withdrawing the head from said electrolyte and thereafter returning the head to a prescribed level in the electrolyte as the poultry traverses said tank.

2. A poultry stunning apparatus for imparting a potential to poultry, as the respective birds are carried by successive shackles in an inverted head down condition along a prescribed path in a poultry processing line, comprising:
   a. an electrolyte tank in said path for containing a liquid electrolyte, said tank being open along its upper side for successively receiving the head portions of said birds on said shackles as said birds are moved by said shackles over said tank;
   b. a frame for supporting said tank;
   c. a base carried by said frame, said base being moveable in a vertical path;
   d. means connected between said frame and said base for supporting and incrementally moving said base upwardly and downwardly in said vertical path;
   e. dielectric means connected to said base for supporting said tank thereon and for electrically insulating said tank from said base; and
   f. electrical circuit means for connection to a potential, one side of which is electrically connected to said tank and the other side being for electrical connection to said birds, as they pass along said processing line and over said tank; and
   g. said apparatus including a tray disposed within said tank for supporting the heads of poultry passed therethrough at a prescribed level below the level of the electrolyte therein, said tray including plates disposed above and below the normal level of the electrolyte in said tank and an inclined ramp connecting the adjacent edges of said plates.

3. In a process for stunning live poultry to render the same less mobile, the steps of:
   a. immersing a portion of the head of the poultry in an electrolyte for a period of time and under such conditions that the poultry does not inhale the electrolyte; and,
   b. thereafter draining the electrolyte from the head while subjecting the body of the poultry to an electric potential through that portion of the head which has been subjected to the electrolyte.

4. A poultry stunning apparatus for imparting a potential to poultry, as the respective birds are carried by successive shackles in an inverted head down condition along a prescribed path in a poultry processing line, comprising:
   a. an electrolyte tank in said path for containing a liquid electrolyte, said tank being open along its upper side for successively receiving the head portions of said birds on said shackles as said birds are moved by said shackles over said tank;
   b. a frame for supporting said tank;
   c. a base carried by said frame, said base being moveable in a vertical path;
   d. means connected between said frame and said base for supporting and incrementally moving said base upwardly and downwardly in said vertical path;
   e. dielectric means connected to said base for supporting said tank thereon and for electrically insulating said tank from said base; and
   f. electrical circuit means for connection to a potential, one side of which is electrically connected to said tank and the other side being for electrical connection to said birds, as they pass along said processing line and over said tank; and
   g. means for supporting salt above the normal level of said electrolyte and means for directing water over said salt to dissolve the same and for feeding the water and salt into the electrolyte.

5. Process for stunning live poultry to render the same less mobile, comprising:
   a. passing successive poultry suspended by their legs, headdown, along a prescribed path across a tank containing an electrolyte at a height such that the head of each poultry will contact said electrolyte;
   b. supporting the head of each poultry above its norman pendant position so that the electrolyte will contact one side of the head of each poultry; and
   c. producing an electrical potential between the body of said poultry and said electrolyte; and
   d. removing said head from said electrolyte and contacting it by an electrode plate during a subsequent portion of said prescribed path for maintaining the electrical potential on said body while said head is in contact with said plate and removed from said electrolyte.

6. The process defined in claim 5 wherein the poultry is subjected to additional cycles of subjecting the head to the electrolyte and then to an electrode plate as the potential through the body via its head is continued.

7. A poultry stunning apparatus for imparting an electric potential to poultry carried successively head down in a poultry line, comprising:
   a. a source of electric potential;
   b. means for connecting one side of said source to the body of the poultry;
   c. an electrolyte tank for containing an electrolyte;
   d. head supporting means comprising a tray having a portion parallel to the surface of the electrolyte and spaced below said surface, said tray being so positioned as to tilt the head of a fowl carried in said line so that one side only of the head is immersed in the electrolyte, thus leaving at least one nostril exposed and allowing the fowl to breath; and
   e. means for connecting the other side of said electric potential to said electrolyte.

8. A poultry stunning apparatus as defined in claim 1 wherein said head supporting means includes a perforated tray having a pair of off-set plates, one of said plates being disposed below the normal surface of the electrolyte in said tank and the other of said plates being disposed above the normal level of the electrolyte in said tank.

* * * * *